(12) United States Patent
Kato et al.

(10) Patent No.: US 7,011,769 B2
(45) Date of Patent: Mar. 14, 2006

(54) GELLING AGENT AND PRODUCTION METHOD THEREOF

(75) Inventors: Takashi Kato, Kawasaki (JP);
Kazuhiro Yabuuchi, Tokyo (JP);
Yusuke Tochigi, Tokyo (JP)

(73) Assignee: JSR Corporation, Tokyo (JP)

( * ) Notice: Subject to any disclaimer, the term of this patent is extended or adjusted under 35 U.S.C. 154(b) by 7 days.

(21) Appl. No.: 10/796,982

(22) Filed: Mar. 11, 2004

(65) Prior Publication Data

US 2005/0199855 A1    Sep. 15, 2005

(51) Int. Cl.
*C09K 19/52* (2006.01)
*C09K 19/54* (2006.01)
*C07D 209/82* (2006.01)

(52) U.S. Cl. .............................. 252/299.5; 252/299.01; 428/1.5; 548/440; 548/441; 548/444

(58) Field of Classification Search ........... 252/299.01, 252/299.5; 548/440, 444, 441; 428/1.5
See application file for complete search history.

(56) References Cited

U.S. PATENT DOCUMENTS 5,464,746 A * 11/1995 Fino .............................. 435/6

OTHER PUBLICATIONS

N. Mizoshita, et al., Chem. Commun., pp. 781-782, "Smectic Liquid-Crystalline Physical Gels. Anisotropic Self-Aggregation of Hydrogen-Bonded Molecules in Layered Structures", 1999.

N. Mizoshita, et al., J. Mater. Chem., vol. 12, pp. 2197-2201, "Electrooptical Properties of Liquid-Crystalline Physical Gels: A New Oligo(Amino Acid) Gelator for Light Scattering Display Materials", 2002.

K. Hanabusa, et al., Chem. Mater., vol. 11, pp. 649-655, "Easy Preparation and Useful Character of Organogel Electrolytes Based on Low Molecular Weight Gelator", 1999.

* cited by examiner

*Primary Examiner*—Shean C. Wu
(74) *Attorney, Agent, or Firm*—Oblon, Spivak, McClelland, Maier & Neustadt, P.C.

(57) ABSTRACT

Disclosed herein are a gelling agent composed of an isoleucine derivative having a carbazolyl group, and a process for preparing a gelling agent, which comprises reacting an isoleucine derivative having a specific skeletal with a compound having a carbazolyl group in the presence of dichloromethane and 1-ethyl-3-(3-dimethylaminopropyl)carbodiimide hydrochloride to obtain an isoleucine derivative having a carbazolyl group.

18 Claims, 1 Drawing Sheet

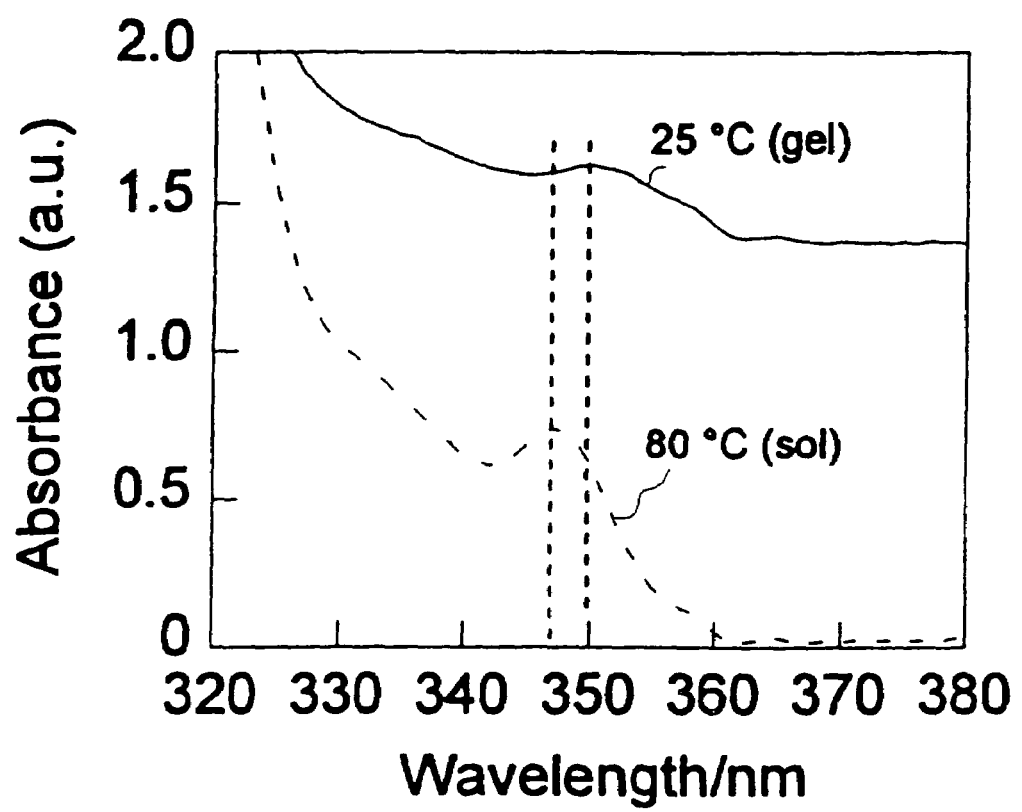

GELLING AGENT AND PRODUCTION METHOD THEREOF

BACKGROUND OF THE INVENTION

1. Field of the Invention

The present invention relates to a gelling agent, which is mixed with an organic solvent or a liquid crystal compound to form a gelling mixture, and a production method thereof.

2. Description of the Background Art

In recent years, those composed of self-organizing low molecules that the molecules gather in a fibrous form by intermolecular interaction to form a fibrous molecular aggregate have attracted attention as gelling agents.

Such a gelling agent is expected as, for example, a material for forming physical gel. As physical gel using a gelling agent, has been proposed, for example, a liquid crystal composition composed of the gelling agent and a liquid crystal compound (see, for example, Japanese Patent Application No. 2002-4462).

However, as the gelling agent, no gelling agent composed of self-organizing low molecules having a molecular structure that a carbazole component has been introduced as a functional component has been known.

SUMMARY OF THE INVENTION

The present invention has been completed as a result of repeated investigations of self-organizing low molecules, which form fibrous molecular aggregates, and has as its first object the provision of a novel gelling agent having a molecular structure that a carbazole component has been introduced into an isoleucine derivative.

A second object of the present invention is to provide a method for producing a novel gelling agent.

According to the present invention, there is thus provided a gelling agent composed of an isoleucine derivative having a carbazolyl group.

The gelling agent according to the present invention may preferably be composed of an isoleucine derivative having a carbazolyl group and represented by the following general formula (1):

General formula (1):

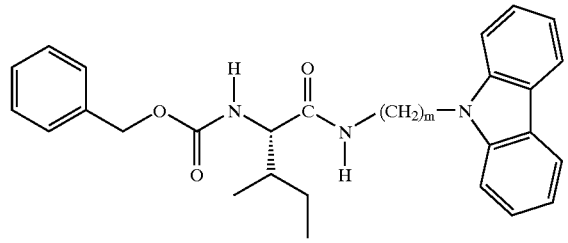

wherein m is an integer of at least 6.

The gelling agent according to the present invention may also be composed of an isoleucine derivative having a carbazolyl group and represented by the following general formula (2):

General formula (2):

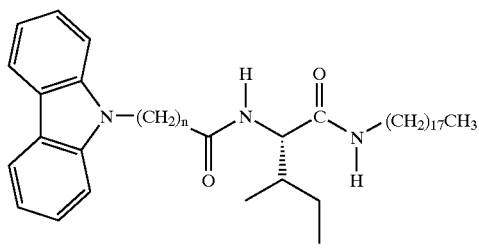

wherein n is an integer of at least 1.

Further, the gelling agent according to the present invention may be composed of an isoleucine derivative having a carbazolyl group and represented by the following formula (1):

Formula (1):

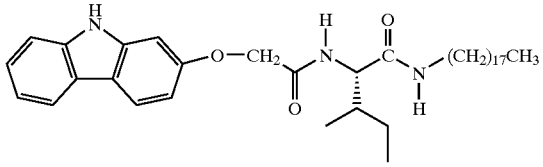

According to the present invention, there is also provided a method for producing a gelling agent, which comprises reacting an isoleucine derivative having a skeleton represented by the following formula (2) with a compound having a carbazolyl group in the presence of dichloromethane and 1-ethyl-3-(3-dimethylaminopropyl)carbodiimide hydrochloride to obtain an isoleucine derivative having a carbazolyl group.

Formula (2):

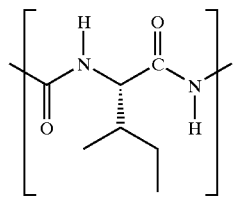

The gelling agents according to the present invention are gelling agents composed of an isoleucine derivative having a molecular structure that a carbazole component derived from a carbazole compound having excellent photoconductivity and light refraction property has been introduced into an isoleucine derivative.

Since such a gelling agent has excellent gel-forming ability, and a functional component composed of the carbazole component is introduced into it, there is a possibility that a fibrous molecular aggregate having photo-electronic functions may be formed.

According to the production method of a gelling agent of the present invention, a novel gelling agent with a carbazole component introduced into an isoleucine derivative can be prepared.

The gelling agents according to the present invention may be suitably used as materials forming physical gel, and the gelling mixtures respectively using the gelling agents have a possibility of being suitably usable as liquid crystal display devices.

BRIEF DESCRIPTION OF THE DRAWING

FIG. 1 illustrates an ultraviolet-visible absorption spectrum of a gelling mixture according to Example 1.

DETAILED DESCRIPTION OF THE PREFERRED EMBODIMENTS

The present invention will hereinafter be described in detail.

Specific preferable examples of the gelling agent according to the present invention include that composed of an isoleucine derivative (hereinafter also referred to as "carbazolyl group containing isoleucine derivative (1)" having the carbazolyl group and represented by the above general formula (1), that composed of an isoleucine derivative (hereinafter also referred to as "carbazolyl group containing isoleucine derivative (2)" having the carbazolyl group and represented by the above general formula (2), and that composed of an isoleucine derivative (hereinafter also referred to as "carbazolyl group containing isoleucine derivative (3)" having the carbazolyl group and represented by the above formula (1).

In the specification of the present invention, the carbazolyl group may have any substituent group.

In the general formula (1), m is an integer of at least 6.

The carbazolyl group containing isoleucine derivative (1) has a lower melting point as m in the general formula (1) becomes greater. A gelling mixture obtained by mixing the gelling agent composed of the carbazolyl group containing isoleucine derivative (1) has a lower gel-sol transition temperature as the melting point of the carbazolyl group containing isoleucine derivative (1) that is a component of the mixture becomes lower.

In the general formula (2), n is an integer of at least 1.

The carbazolyl group containing isoleucine derivative (2) has a lower melting point as n in the general formula (2) becomes greater. A gelling mixture obtained by mixing the gelling agent composed of the carbazolyl group containing isoleucine derivative (2) has a lower gel-sol transition temperature as the melting point of the carbazolyl group containing isoleucine derivative (2) that is a component of the mixture becomes lower.

The gelling agents composed of the carbazolyl group containing isoleucine derivative (1), the carbazolyl group containing isoleucine derivative (2) and the carbazolyl group containing isoleucine derivative (3) are preferred as the gelling agents according to the present invention. However, the gelling agents according to the present invention are not limited to these, and it is only necessary to consist of an isoleucine derivative (hereinafter also referred to as "carbazolyl group containing isoleucine derivative") having the carbazolyl group.

Specifically, the carbazolyl group containing isoleucine derivative constituting the gelling agent according to the present invention is only required to have a molecular structure that at least one of a benzoyloxy group and an alkyl group at a terminal of an isoleucine derivative represented by the following formula (3) is substituted by a carbazolyl group.

Formula (3):

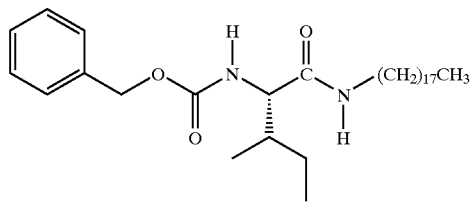

The gelling agent composed of such a carbazolyl group containing isoleucine derivative as described above can be prepared by reacting an isoleucine derivative (hereinafter also referred to as "raw isoleucine derivative") having a skeleton represented by the above formula (2) with a compound (hereinafter also referred to as raw carbazole derivatives) having a carbazolyl group in the presence of dichloromethane and 1-ethyl-3-(3-dimethyl-aminopropyl) carbodiimide hydrochloride.

In this reaction, the number of moles of the raw isoleucine derivative and the number of moles of the raw carbazole derivative are substantially equivalent to each other and preferably reside in an equimolar relation.

The amount of dichloromethane used is preferably 5,000 to 10,000 parts by mass per 100 parts by mass of the raw isoleucine derivative.

The amount of 1-ethyl-3-(3-dimethylaminopropyl)carbodiimide hydrochloride used is preferably 120 to 200 parts by mass per 100 parts by mass of the raw isoleucine derivative.

The reaction temperature is, for example, 20 to 30° C., and the reaction time is, for example, 3 to 6 hours.

Synthesis process for forming the carbazolyl group containing isoleucine derivative (1) is shown in the following reaction scheme (1). Synthesis process for forming the carbazolyl group containing isoleucine derivative (2) is shown in the following reaction scheme (2). Synthesis process for forming the carbazolyl group containing isoleucine derivative (3) is shown in the following reaction scheme (3).

Reaction scheme (1):

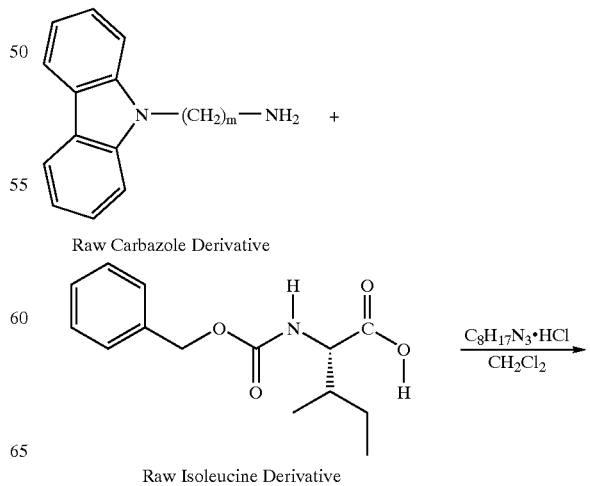

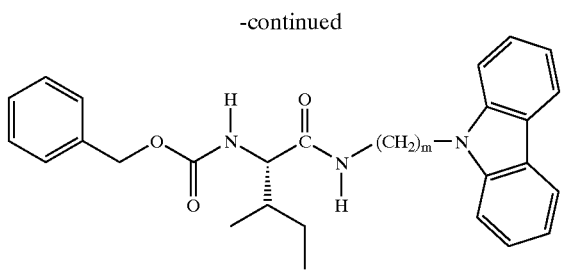

In the formula, m is an integer of at least 6.

Reaction scheme (2):

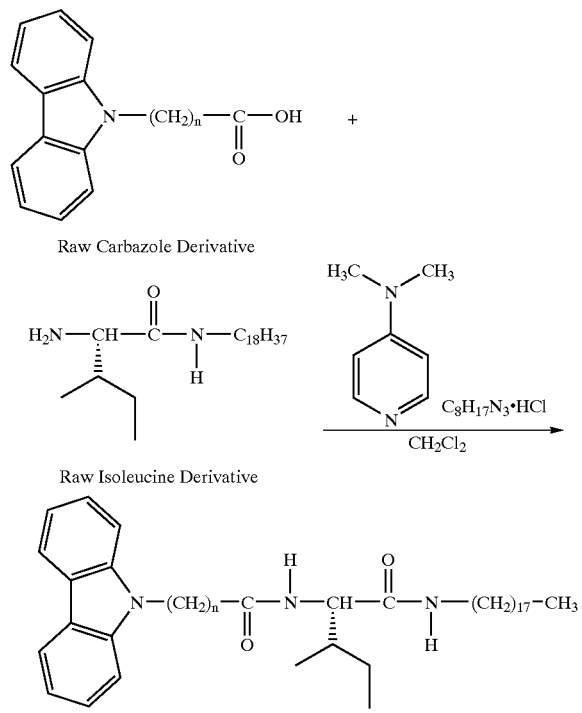

In the formula, n is an integer of at least 1.

Reaction scheme (3):

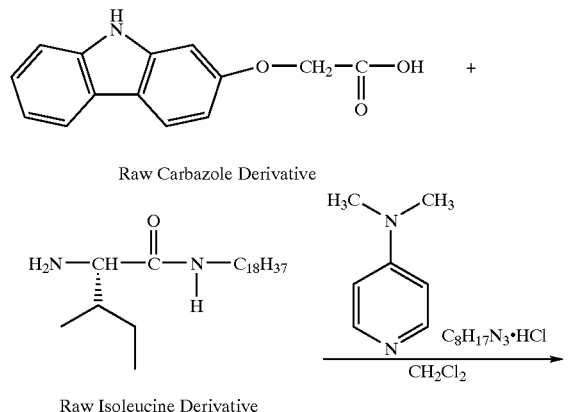

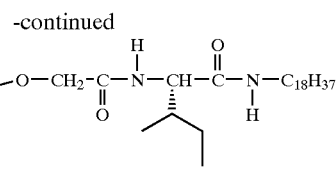

It is preferred that 4-(N,N-dimethylamino)pyridine be present in reaction systems for forming the carbazolyl group containing isoleucine derivative (2) and the carbazolyl group containing isoleucine derivative (3).

The reason for it is that a high yield can be achieved.

4-(N,N-Dimethylamino)pyridine may also be used in a reaction system for forming the carbazolyl group containing isoleucine derivative (1).

The gelling agents according to the present invention may also be prepared by any other method than the production method described above.

Such a gelling agent as described above has good gel-forming ability for organic solvents or liquid crystal compounds and has a possibility that a fibrous molecular aggregate having photo-electronic functions such as photoconductivity derived from the carbazole component may be formed.

Such a gelling agent may be suitably used as a material forming physical gel, and a gelling mixture using the gelling agent has a possibility of being suitably usable as a liquid crystal display device.

Examples of the organic solvents include ethyl acetate, ethanol, methanol, acetone, carbon tetrachloride, chloroform, benzene, toluene, tetrahydrofuran and N,N-dimethylformamide.

Examples of the liquid crystal compounds include 4-pentyl-4'-cyanobiphenyl, 4-octyl-4'-cyanobiphenyl and 4-octyloxy-4'-cyanobiphenyl.

The present invention will hereinafter be described by the following examples. However, the present invention is not limited to these examples.

EXAMPLE 1

(Preparation Example 1 of Gelling Agent)

With 1.40 g of a compound, in which m in the raw carbazole derivative in the reaction scheme (1) is 12, were mixed 1.06 g of Z-L-isoleucine, 52.8 g of dichloromethane and 0.920 g of 1-ethyl-3-(3-dimethylaminopropyl)carbodiimide hydrochloride, and this system was subjected to a reaction at 25° C. for 3 hours, thereby obtaining a reaction product at a yield of 65%.

As the result of the following elemental analysis and NMR measurement (solvent: deuterated chloroform), the resultant reaction product was identified as a carbazolyl group containing isoleucine derivative (hereinafter also referred to as "Gelling Agent (1)"), in which m in the general formula (1) is 12.

Gelling Agent (1) had a melting point of 106° C.

(Result of Elemental Analysis)
Calculated: C 76.34; H 8.60; N 7.03%.
Found: C 76.07; H 8.37; N 7.41%.

(Result of NMR Measurement)
$CDCl_3$, δ 8.11–8.10(d,J=7.6 Hz,2H), 7.48–7.21(m,11H), 5.76(m,1H), 5.30(m,1H), 5.10(s,2H), 4.32–4.28(t,J=7.2

Hz,2H), 3.94–3.90(t,J=6.8 Hz,1H), 3.21(m,2H), 1.89–1.85 (m,4H), 1.47–1.23(m,21H), 0.93–0.88(m,6H)

(Confirmation of Gel-forming Ability of Gelling Agent (1))

With respect to Gelling Agent (1), the gel-forming ability for various organic solvents and liquid crystal compounds was investigated. As a result, Gelling Agent (1) exhibited good gel-forming ability for ethyl acetate, acetone, carbon tetrachloride, benzene and toluene that are organic solvents and for 4-pentyl-4'-cyanobiphenyl and 4-octyl-4'-cyanobiphenyl that are liquid crystal compounds.

Gelling mixtures composed of Gelling Agent (1) and each of the organic solvents and liquid crystal compounds, for which Gelling Agent (1) exhibited the gel-forming ability, were observed through a scanning electron microscope respectively. As a result, it was confirmed that a fibrous molecular aggregate derived from Gelling Agent (1) having a network structure that fine and long fibers were entangled with each other is formed in an isotropic phase of each of the organic solvents and liquid crystal compounds forming the respective gelling mixtures.

(Confirmation of Properties of Gelling Mixture Used Gelling Agent (1))

The sol-gel transition temperature of a gelling mixture obtained by mixing 3% by mass of Gelling Agent (1) with 4-octyl-4'-cyanobiphenyl, that is a liquid crystal compound, was measured and found to be 15° C.

A formed state of a fibrous molecular aggregate in a smectic A phase obtained by adding 1 to 3% by mass of Gelling Agent (1) to 4-octyl-4'-cyanobiphenyl, that is a liquid crystal compound, and orientating it in one direction was observed through a scanning electron microscope and a polarizing microscope. As a result, it was confirmed that fibers grow predominantly in a direction parallel to the orientation direction of the liquid crystal molecules.

A gelling mixture obtained by adding 10% by mass of Gelling Agent (1) to 4-octyl-4'-cyanobiphenyl was enclosed into a cell having a thickness of 5 μm and formed by 2 glass sheets to measure an ultraviolet-visible absorption spectrum in a temperature range of from 25 to 80° C. As a result, a peak appeared at 350 nm in a gel state shifted to 347 nm in a sol state. The shift of the peak in this spectrum is considered to be attributable to the fact that carbazolyl groups in the fibrous molecular aggregate are stacked. The result is illustrated in FIG. 1.

In FIG. 1, the ultraviolet-visible absorption spectrum in the gel state is shown by a solid line, and the ultraviolet-visible absorption spectrum in the sol state is shown by a broken line.

EXAMPLE 2

(Synthesis Example 2 of Gelling Agent)

With 1.06 g of a compound, in which m in the raw carbazole derivative in the reaction scheme (1) is 6, were mixed 1.12 g of Z-L-isoleucine, 39.6 g of dichloromethane and 1.60 g of 1-ethyl-3-(3-dimethylaminopropyl)carbodiimide hydrochloride, and this system was subjected to a reaction at 25° C. for 12 hours, thereby obtaining a reaction product at a yield of 44%.

As the result of the following elemental analysis and NMR measurement (solvent: deuterated chloroform), the resultant reaction product was identified as a carbazolyl group containing isoleucine derivative (hereinafter also referred to as "Gelling Agent (2)"), in which m in the general formula (1) is 6.

Gelling Agent (2) had a melting point of 172° C.

(Result of Elemental Analysis)
Calculated: C 74.82; H 7.65; N 8.18%.
Found: C 74.88; H 8.04; N 8.48%.

(Result of NMR Measurement)
CDCl$_3$, δ 8.13–8.11(d,J=7.6 Hz,1H), 8.11–8.10(d,J=6.8 Hz,1H), 7.50–7.21(m,11H), 5.77–5.76(m,1H), 5.29–5.27(m, 1H), 5.09(s,2H), 4.31–4.29(t,J=7.6 Hz,2H), 3.93–3.88(m, 1H), 3.26–3.16(m,2H), 1.87(m,4H), 1.45–1.39(m,7H), 0.93–0.88(m,6H)

(Confirmation of Gel-forming Ability of Gelling Agent (2))

With respect to Gelling Agent (2), the gel-forming ability for various organic solvents and liquid crystal compounds was investigated. As a result, Gelling Agent (2) exhibited good gel-forming ability for carbon tetrachloride and benzene that are organic solvents.

Gelling mixtures composed of Gelling Agent (2) and each of the organic solvents, for which Gelling Agent (2) exhibited the gel-forming ability, were observed through a scanning electron microscope respectively. As a result, it was confirmed that a fibrous molecular aggregate derived from Gelling Agent (2) having a network structure that fine and long fibers were entangled with each other is formed in an isotropic phase of each of the organic solvents forming the respective gelling mixtures.

EXAMPLE 3

(Synthesis Example 3 of Gelling Agent)

With 0.502 g of a compound, in which n in the raw carbazole derivative in the reaction scheme (2) is 6, were mixed 0.661 g of a compound indicated as the raw isoleucine derivative in the reaction scheme (2), 53.1 g of dichloromethane, 0.487 g of 1-ethyl-3-(3-dimethylaminopropyl) carbodiimide hydrochloride and 0.0210 g of 4-(N,N-dimethylamino)pyridine, and this system was subjected to a reaction at 25° C. for 24 hours, thereby obtaining a reaction product at a yield of 30%.

As the result of the following elemental analysis and NMR measurement (solvent: deuterated chloroform), the resultant reaction product was identified as a carbazolyl group containing isoleucine derivative (hereinafter also referred to as "Gelling Agent (3)"), in which n in the general formula (2) is 6.

Gelling Agent (3) had a melting point of 138° C.

(Result of Elemental Analysis)
Calculated: C 78.25; H 10.54; N 6.37%.
Found: C 78.31; H 10.62; N 6.66%.

(Result of NMR Measurement)
CDCl$_3$, δ 8.11–8.10(d,J=8.0 Hz,2H), 7.48–7.39(m,4H), 7.24–7.21 (m,2H), 6.02–6.00(d,J=8.8 Hz,1H), 5.75(m,1H), 4.32–4.28(t,J=7.2 Hz,2H), 4.17–4.13(t,J=8.4 Hz,1H), 3.29–3.26(m,1H), 3.19–3.15(m,1H), 2.17–2.13(t,J=8.0 Hz,2H), 1.89–1.86(t,J=7.2 Hz,2H), 1.25(m,40H)

(Confirmation of Gel-forming Ability of Gelling Agent (3))

With respect to Gelling Agent (3), the gel-forming ability for various organic solvents and liquid crystal compounds was investigated. As a result, Gelling Agent (3) exhibited good gel-forming ability for ethyl acetate, ethanol, methanol, acetone, carbon tetrachloride, benzene, toluene and N,N-dimethylformamide that are organic solvents and for 4-octyl-4'-cyanobiphenyl that is a liquid crystal compound.

Gelling mixtures composed of Gelling Agent (3) and each of the organic solvents and liquid crystal compounds, for which Gelling Agent (3) exhibited the gel-forming ability, were observed through a scanning electron microscope respectively. As a result, it was confirmed that a fibrous molecular aggregate derived from Gelling Agent (3) having a network structure that fine and long fibers were entangled with each other is formed in an isotropic phase of each of the organic solvents and liquid crystal compounds forming the respective gelling mixtures.

(Comfirmation of Properties of Gelling Mixture Used Gelling Agent (3))

The sol-gel transition temperature of a gelling mixture obtained by mixing 3% by mass of Gelling Agent (3) with 4-octyl-4'-cyanobiphenyl, that is a liquid crystal compound, was measured and found to be 40° C.

A formed state of a fibrous molecular aggregate in a smectic A phase obtained by adding 0.5% by mass of Gelling Agent (3) to 4-octyl-4'-cyanobiphenyl and orientating it in one direction was observed through a scanning electron microscope and a polarizing microscope. As a result, it was confirmed that fibers grow predominantly in directions perpendicular and parallel to the orientation direction of the liquid crystal molecules.

EXAMPLE 4

(Synthesis Example 4 of Gelling Agent)

With 0.382 g of a compound, in which n in the raw carbazole derivative in the reaction scheme (2) is 1, were mixed 0.651 g of a compound indicated as the raw isoleucine derivative in the reaction scheme (2), 31.0 g of dichloromethane, 0.496 g of 1-ethyl-3-(3-dimethylaminopropyl)carbodiimide hydrochloride and 0.0244 g of 4-(N,N-dimethylamino)pyridine, and this system was subjected to a reaction at 25° C. for 26 hours, thereby obtaining a reaction product at a yield of 78%.

As the result of the following elemental analysis and NMR measurement (solvent: deuterated chloroform), the resultant-reaction product was identified as a carbazolyl group containing isoleucine derivative (hereinafter also referred to as "Gelling Agent (4)"), in which n in the general formula (2) is 1.

Gelling Agent (4) had a melting point of 234° C.

(Result of Elemental Analysis)
Calculated: C 77.37; H 10.08; N 7.12%.
Found: C 77.25; H 9.95; N 7.43%.

(Result of NMR Measurement)
CDCl$_3$, δ 8.13–8.11(d,J=7.6 Hz,2H), 7.49–7.46(m,4H), 7.36–7.28(m,2H), 5.89–5.86(d,J=8.6 Hz,1H), 5.59(m,1H), 4.96(s,1H), 4.17–4.11(t,J=7.2 Hz,2H), 3.15–3.06(m,2H), 1.70–1.65(m,2H), 1.39–1.25(m,32H), 0.90–0.85(t,J=6.3 Hz,3H), 0.72–0.63(m,6H)

(Confirmation of Gel-forming Ability of Gelling Agent (4))

With respect to Gelling Agent (4), the gel-forming ability for various organic solvents and liquid crystal compounds was investigated. As a result, Gelling Agent (4) exhibited good gel-forming ability for ethyl acetate, ethanol, chloroform, benzene, tetrahydrofuran and N,N-dimethylformamide that are organic solvents and for 4-pentyl-4'-cyanobiphenyl, 4-octyl-4'-cyanobiphenyl and 4-octyloxy-4'-cyanobiphenyl that are liquid crystal compounds.

Gelling mixtures composed of Gelling Agent (4) and each of the organic solvents and liquid crystal compounds, for which Gelling Agent (4) exhibited the gel-forming ability, were observed through a scanning electron microscope respectively. As a result, it was confirmed that a fibrous molecular aggregate derived from Gelling Agent (4) having a network structure that fine and long fibers were entangled with each other is formed in an isotropic phase of each of the organic solvents and liquid crystal compounds forming the respective gelling mixtures.

(Confirmation of Properties of Gelling Mixture Using Gelling Agent (4))

The sol-gel transition temperature of a gelling mixture obtained by mixing 3% by mass of Gelling Agent (4) with 4-octyl-4'-cyanobiphenyl, that is a liquid crystal compound, was measured and found to be 106° C.

The sol-gel transition temperature of a gelling mixture obtained by mixing 3% by mass of Gelling Agent (4) with 4-octyloxy-4'-cyanobiphenyl, that is a liquid crystal compound, was measured and found to be 108° C.

A formed state of a fibrous molecular aggregate in a smectic A phase obtained by adding 0.2% by mass of Gelling Agent (4) to 4-octyloxy-4'-cyanobiphenyl and orientating it in one direction was observed through a scanning electron microscope and a polarizing microscope. As a result, it was confirmed that fibers grow predominantly in a direction perpendicular to the orientation direction of the liquid crystal molecules.

EXAMPLE 5

(Synthesis Example 5 of Gelling Agent)

With 0.232 g of a compound indicated as the raw carbazole derivative in the reaction scheme (3), were mixed 0.384 g of a compound indicated as the raw isoleucine derivative in the reaction scheme (3), 66.3 g of dichloromethane, 0.491 g of 1-ethyl-3-(3-dimethylaminopropyl)carbodiimide hydrochloride and 0.0122 g of 4-(N,N-dimethylamino)pyridine, and this system was subjected to a reaction at 25° C. for 27 hours, thereby obtaining a reaction product at a yield of 50%.

As the result of the following elemental analysis and NMR measurement (solvent: deuterated dimethyl sulfoxide), the resultant reaction product was identified as a carbazolyl group containing isoleucine derivative (hereinafter also referred to as "Gelling Agent (5)") represented by the general formula (1).

Gelling Agent (5) had a melting point of 191° C.

(Result of Elemental Analysis)
Calculated: C 75.33; H 9.82; N 6.94%.
Found: C 75.14; H 9.68; N 7.27%.

(Result of NMR Measurement)
CDCl$_3$, δ 11.16(s,1H), 8.07(m,1H), 8.01–7.97(t,J=7.2 Hz,2H) 7.90–7.88(d,J=8.0 Hz,1H), 7.43–7.41(d,J=8.0 Hz,1H), 7.31–7.27(t,J=6.8 Hz,1H), 7.13–7.09(t,J=7.2 Hz,1H), 6.96(s,1H), 6.82–6.80(d,J=8.4 Hz,1H), 4.64(s,2H), 4.24–4.20(m,1H), 3.12–3.08(t,J=7.2 Hz,1H), 2.99–2.96(t, J=7.2 Hz,1H), 1.73(m,1H), 1.36(m,2H), 1.21(m,32H), 0.86–0.78(m,9H).

(Confirmation of Gel-forming Ability of Gelling Agent (5))

With respect to Gelling Agent (5), the gel-forming ability for various organic solvents and liquid crystal compounds was investigated. As a result, Gelling Agent (5) exhibited good gel-forming ability for ethyl acetate, ethanol, acetone, chloroform, benzene and N,N-dimethylformamide that are organic solvents and for 4-pentyl-4'-cyanobiphenyl, 4-octyl-4'-cyanobiphenyl and 4-octyloxy-4'-cyanobiphenyl that are liquid crystal compounds.

Gelling mixtures composed of Gelling Agent (5) and each of the organic solvents and liquid crystal compounds, for which Gelling Agent (5) exhibited the gel-forming ability, were observed through a scanning electron microscope respectively. As a result, it was confirmed that a fibrous molecular aggregate derived from Gelling Agent (5) having a network structure that thick fibers were entangled with each other is formed in an isotropic phase of each of the organic solvents and liquid crystal compounds forming the respective gelling mixtures.

(Confirmation of Properties of Gelling Mixture Used Gelling Agent (5))

The sol-gel transition temperature of a gelling mixture obtained by mixing 3% by mass of Gelling Agent (5) with 4-octyl-4'-cyanobiphenyl, that is a liquid crystal compound, was measured and found to be 65° C.

The sol-gel transition temperature of a gelling mixture obtained by mixing 3% by mass of Gelling Agent (5) with 4-octyloxy-4'-cyanobiphenyl, that is a liquid crystal compound, was measured and found to be 67° C.

From the results described above, it was confirmed that the gelling agents according to Examples 1 to 5 have a molecular structure that a carbazole component has been introduced into an isoleucine derivative, and have good gel-forming ability for organic solvents or liquid crystal compounds.

It was also confirmed that the gelling mixtures respectively containing the gelling agents according to Examples 1 and 3 to 5 in particular have a possibility of being suitably usable as liquid crystal display devices.

It was further confirmed from the gelling agents according to Examples 1 and 2 that the carbazolyl group containing isoleucine derivative (1) constituting each gelling agent has a lower melting point as m in the general formula (1) becomes greater, and a gelling mixture obtained by mixing a gelling agent composed of the carbazolyl group containing isoleucine derivative (1) has a lower gel-sol transition temperature as the melting point of the carbazolyl group containing isoleucine derivative (1) that is a component of the mixture becomes lower.

It was still further confirmed from the gelling agents according to Examples 3 and 4 that the carbazolyl group containing isoleucine derivative (2) constituting each gelling agent has a lower melting point as n in the general formula (2) becomes greater, and a gelling mixture obtained by mixing a gelling agent composed of the carbazolyl group containing isoleucine derivative (2) has a lower gel-sol transition temperature as the melting point of the carbazolyl group containing isoleucine derivative (2) that is a component of the mixture becomes lower.

What is claimed is:

1. A gelling agent having an isoleucine derivative having a carbazolyl group and represented by the following formula (1):

formula (1):

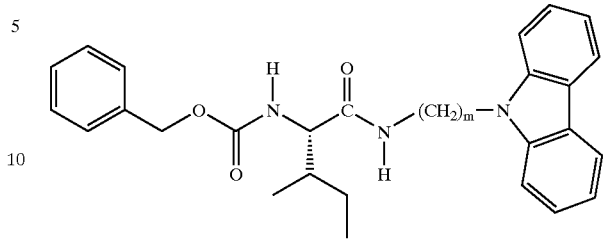

wherein m is an integer of 6–12.

2. A gelling agent having an isoleucine derivative having a carbazolyl group and represented by the following formula (2):

formula (2):

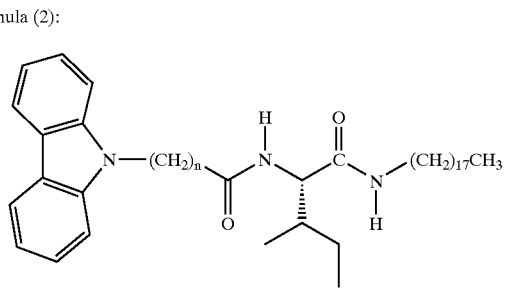

wherein n is an integer of 1–6.

3. A gelling agent having an isoleucine derivative having a carbazolyl group and represented by the following formula (1):

Formula (1):

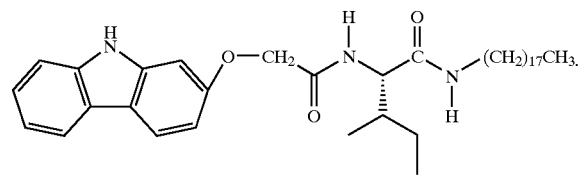

4. A method for producing a gelling agent, which comprises:
reacting an isoleucine derivative having a skeleton represented by the following formula (a) with a compound having a carbazolyl group represented by formula (b) in the presence of dichloromethane and 1-ethyl-3-(3-dimethylaminopropyl)-carbodiimide hydrochloride to obtain the gelling agent according to claim 2

Formula (a):

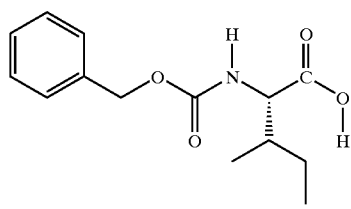

Formula (b):

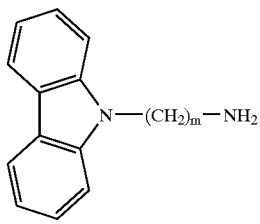

wherein m is an integer of 6–12.

5. A method for producing a gelling agent, which comprises:
reacting an isoleucine derivative represented by the following formula (c) with a compound having a carbazolyl group represented by the following formula (d) in the presence of dichloromethane and 1-ethyl-3-(3-dimethylaminopropyl)-carbodiimide hydrochloride to obtain the gelling agent according to claim 3

Formula (c):

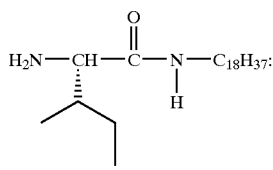

Formula (d):

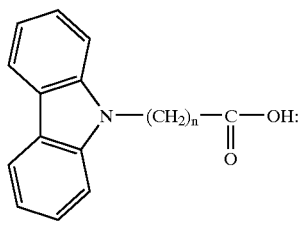

wherein n is an integer of 1–6.

6. A method for producing a gelling agent, which comprises:
reacting an isoleucine derivative represented by the following formula (e) with a compound having a carbazolyl group represented by the following formula (f) in the presence of dichloromethane and 1-ethyl-3-(3-dimethylaminopropyl)-carbodiimide hydrochloride to obtain the gelling agent according to claim 4

Formula (e):

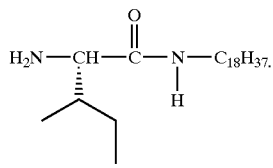

Formula (f):

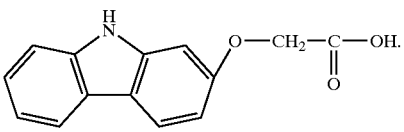

7. A gelling mixture comprising the gelling agent of claim 1 and at least one of an organic solvent and a liquid crystal compound.

8. A gelling mixture comprising the gelling agent of claim 2 and at least one of an organic solvent and a liquid crystal compound.

9. A gelling mixture comprising the gelling agent of claim 3 and at least one of an organic solvent and a liquid crystal compound.

10. The gelling agent of claim 7, comprising at least one organic solvent selected from the group consisting of ethylacetate, ethanol, methanol, acetone, carbon tetrachloride, chloroform, benzene, toluene, tetrahydrofuran and N,N-dimethylformamide.

11. The gelling agent of claim 8, comprising at least one organic solvent selected from the group consisting of ethylacetate, ethanol, methanol, acetone, carbon tetrachloride, chloroform, benzene, toluene, tetrahydrofuran and N,N-dimethylformamide.

12. The gelling agent of claim 9, comprising at least one organic solvent selected from the group consisting of ethylacetate, ethanol, methanol, acetone, carbon tetrachloride, chloroform, benzene, toluene, tetrahydrofuran and N,N-dimethylformamide.

13. The gelling mixture of claim 7, comprising at least one liquid crystal compound selected from the group consisting of 4-pentyl-4'-cyanobiphenyl, 4-octyl-4'-cyanobiphenyl and 4-octyloxy-4'-cyanobiphenyl.

14. The gelling mixture of claim 8, comprising at least one liquid crystal compound selected from the group consisting of 4-pentyl-4'-cyanobiphenyl, 4-octyl-4'-cyanobiphenyl and 4-octyloxy-4'-cyanobiphenyl.

15. The gelling mixture of claim 9, comprising at least one liquid crystal compound selected from the group consisting of 4-pentyl-4'-cyanobiphenyl, 4-octyl-4'-cyanobiphenyl and 4-octyloxy-4'-cyanobiphenyl.

16. A gelling mixture comprising the gelling agent of claim 1 and from 1 to 10 mass % of at least one liquid crystal compound selected from the group consisting of 4-pentyl-4'-cyanobiphenyl, 4-octyl-4'-cyanobiphenyl and 4-octyloxy-4'-cyanobiphenyl.

17. A gelling mixture comprising the gelling agent of claim 2 and from 1 to 10 mass % of at least one liquid crystal compound selected from the group consisting of 4-pentyl-4'-cyanobiphenyl, 4-octyl-4'-cyanobiphenyl and 4-octyloxy-4'-cyanobiphenyl.

18. A gelling mixture comprising the gelling agent of claim 3 and from 1 to 10 mass % of at least one liquid crystal compound selected from the group consisting of 4-pentyl-4'-cyanobiphenyl, 4-octyl-4'-cyanobiphenyl and 4-octyloxy-4'-cyanobiphenyl.

* * * * *